United States Patent [19]

Schobinger et al.

[11] Patent Number: 4,626,437
[45] Date of Patent: Dec. 2, 1986

[54] METHOD FOR THE PREPARATION OF ALCOHOL-FREE WINE

[75] Inventors: Ulrich Schobinger, Zug; Robert Waldvogel; Peter Dürr, both of Wädenswil, all of Switzerland

[73] Assignee: Schweizerische Eidgenossenschaft, Wadenswil, Switzerland

[21] Appl. No.: 701,664

[22] PCT Filed: Feb. 1, 1982

[86] PCT No.: PCT/CH82/00013

§ 371 Date: Sep. 29, 1982

§ 102(e) Date: Sep. 29, 1982

[87] PCT Pub. No.: WO82/02723

PCT Pub. Date: Aug. 19, 1982

Related U.S. Application Data

[63] Continuation of Ser. No. 432,935, Sep. 29, 1982, abandoned.

[30] Foreign Application Priority Data

Feb. 6, 1981 [CH] Switzerland .............................. 889/81

[51] Int. Cl.[4] .............................. A23L 2/02; A23L 2/38

[52] U.S. Cl. .............................. 426/387; 426/592; 426/14; 426/493; 426/494

[58] Field of Search .............................. 426/11, 14, 15, 492, 426/493, 494, 592, 387

[56] References Cited

U.S. PATENT DOCUMENTS

| | | | |
|---|---|---|---|
| 1,084,833 | 1/1914 | Wagner | 426/493 |
| 1,264,564 | 4/1918 | Russell | 426/494 |
| 3,052,546 | 6/1961 | Riddell et al. | 426/493 |
| 4,265,920 | 5/1981 | Thijssen | 426/494 |

FOREIGN PATENT DOCUMENTS 0800188  2/1981  U.S.S.R. .............................. 426/493

*Primary Examiner*—Robert Yoncoskie
*Attorney, Agent, or Firm*—Shenier & O'Connor

[57] ABSTRACT

There is disclosed a method for preparing an alcohol-free wine product. A completely fermented wine is evaporated to produce a dealcholized wine concentrate and a vapor condensate containing alcohol and aromatic substances. The condensate is separated into a fraction comprising alcohol and aromatic substances. The aromatic substances are mixed with dealcoholized wine concentrate, fruit juice concentrate, fruit juice or water to produce an alcohol-free wine product.

7 Claims, 1 Drawing Figure

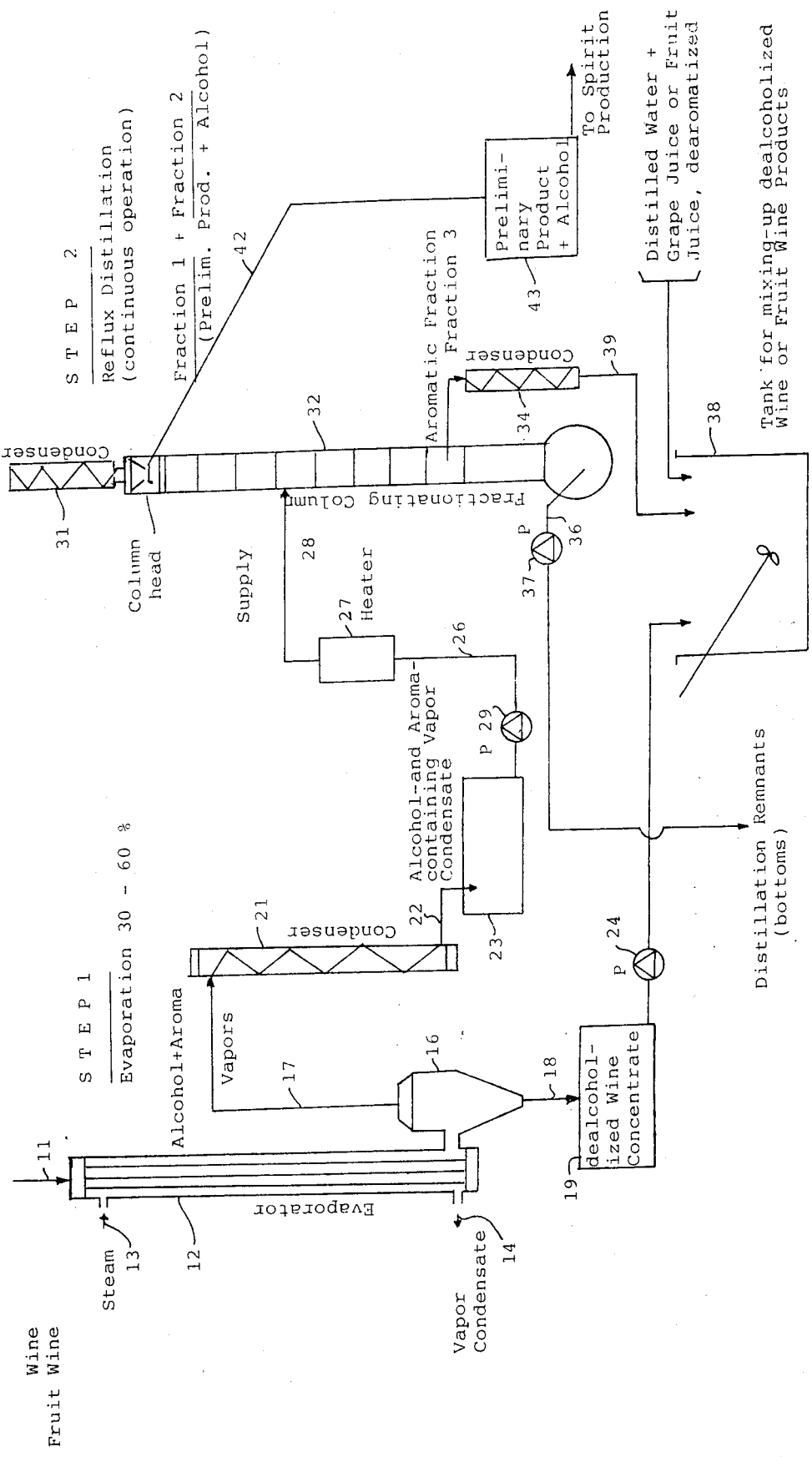

METHOD FOR THE PREPARATION OF ALCOHOL-FREE WINE

This is a continuation of application Ser. No. 432,935, filed Sept. 29, 1982, now abandoned.

The invention relates to a method for the manufacture of alcohol-free or fruit wine, where the originally present alcohol content is reduced to an extent, that the latter does not exceed in the inventively manufactured products the legal limits for nutritional products set for alcohol-free fruit juices or alcohol-free beer. The inventive method in particular permits the manufacture of alcohol-free wines or fruit wines whose ethyl alcohol content lies below the value of the 5 g/kg limit set by the International rules of the Codex Alimtarius of the IAO/WHO for fruit juices.

An alcohol-free wine or fruit juice should, according to the designation, contain all original components of the alcohol-containing initial material, with the exception of alcohol. Any heterogenous additions are to be excluded for basic considerations, but primarily for legal nutritional considerations. In addition to dry substances or extract materials there should primarily also be present to a large extent, and as much as possible volatile aromatic materials. These include both the aromatic materials of the type present in the species, for example, muskat aroma, as well as any by-products obtained during the alcoholic fermentation This includes particularly the higher alcohols, and furthermore ester, aldehyde, ketone, acids, lactone, and the like. The entire amount of the aromatic materials in wine or fruit wine is very low and amounts to about 0.5–1 g/l. They are nevertheless of decisive importance for the character of a wine or of a fruit wine.

Until today it has not yet been possible to manufacture so-called alcohol-wines or fruit wines of a satisfactory quality with respect to smell and taste. The thermal methods used today for the removal of alcohol by direct distillation of wine or fruit wine leaves products of an unsatisfactory sensory quality, as the aromatic materials are largely removed by the aforesaid processes together with the alcohol. Neither any subsequent addition of a small amount of wine or fruit wine, nor any addition of fermentation type carbon dioxide to the product, from which alcohol has been removed, yield a satisfactory result with respect to the quantity of aromatic substances, taking into consideration the legal limit values. Often the products manufactured according to the aforesaid process suffer additional damage due to heat, (a so-called boiling tinge) in view of a longer dwelling time at higher temperatures. Even the protective process of reverse osmosis may not be used for the manufacture of alcohol-free wines or fruit wines having an alcohol content below 5 g/kg, as the aromatic materials are diffused simultaneously with the alcohol through the membrane, and are therefore lost. Other methods, such as the premature stoppage of fermentation, lead to unripe fruit juice like wines or fruit wines, which are not at all satisfactory as far as taste is concerned.

An object of the present invention is a method for the manufacture of alcohol-free wines or fruit wines, wherein in a first step the alcohol, together with the aromatic substances, is evaporated, together with the aromatic substances from the wine or fruit wine, the alcohol-containing, and aroma-containing vapor condensate is rectified in a second step, the aromatic substances separated thereby are again added to the concentrate devoid of any alcohol in a third step, and mixed together with a de-aromatized grape juice of fruit juice and de-mineralized or distilled water, to yield the final alcohol-free beverage.

The aforesaid de-aromatization of the fruit juices employed for harmonizing the fruit juices for taste (grape juice, apple juice, etc.) is absolutely necessary for the inventive process for the manufacture of alcohol-free wine or fruit wine having an alcohol content of less than 5 g/kg, so as to remove, on one hand, the alcohol always present in small quantities in the fruit juices, and on the other hand, to eliminate any undesired dull components of smell and so-called fruity-sweet aromatic components. The evaporation rate required therefor lies between 15–30%.

The present invention will be further illustrated by reference to the accompanying drawing, which is a flow schematic of one embodiment of the process of the present invention.

The devices suitable for the inventive evaporation of the alcohol and the aromatic materials include particularly evaporators which permit as rapid and or protective an evaporation as possible of wine or fruit wine, for example, tube evaporators, plate evaporators, thin-layer evaporators, expanding-flow evaporators, centrifugal evaporators, dual material evaporators, or low temperature evaporators. The evaporating temperatures may vary between 15° up to 100° C. The dwelling time of the product during low temperatures amounts to, for example, 15 to 20 minutes, in the case of higher temperatures 1–4 minutes, in the case of thin layer evaporators and centrifugal evaporators, less than 1 minute. The evaporation may be accomplished either by under-pressure or during normal pressure and under-pressure.

The alcohol-containing and aroma-containing vapors resulting in the inventive evaporation of wine or fruit wine must be condensed in suitable coolers, preferably without any loss, and cooled to temperatures below 20° C. The evaporation rate required for practically complete removal of alcohol amounts to between 30–60%, depending on the evaporation type and the evaporation method.

The evaporation of the wine or fruit wine must be accomplished to such an extent, that the remaining alcohol content in the wine condensate or in the fruit wine condensate falls below 2 g/l, following renewed thinning to the original strength. The evaporation is preferably accomplished in vacuum through several stages. By a 15–20% evaporation of wine or fruit wine during normal pressure in a one-stage evaporator, the majority of the aromatic substances can readily be obtained. The remaining alcohol can be reduced by an additional evaporation of 15–25% in vacuum, using the above-cited limit of 2 g/l.

The vapor condensate obtained, according to the inventive method, includes the majority of characteristic aromatic substances, in addition to alcohol. It has been shown that these vapor condensates, free from any extracts, are to a large extent stable, contrary to wine or fruit wine, during subsequent rectification, namely, even during rectification of longer duration, no significant heat damage is caused in the distilling column.

The required separation of the alcohol from the aromatic materials is obtained, according to the inventive method, by a counterflow or reflux type distillation of the common vapors in a rectification column of adequate effectiveness. The known floor-columns and filling body columns, as well as separate constructions, for example, Sulzer columns known in the distilling art, are suitable as rectifying devices. The type of column is not of any decisive importance for the inventive method, but the number of the theoretically required separating stages should be above 40, better still between 60–80, in order to obtain a sufficiently effective fractionating degree.

During the continuous operation of the reflux type distillation, the alcohol-free vapor, containing aromatic substances and supplied to the device in its lower one-half, is split up into the following fractions and removed from the head of the column:

Preliminary product (primarily methanol and ethylene acetate): to 76° C.

Alcohol fractions (primarily ethanol): 76°–78° C.

Aromatic fractions (the most important aromatic substances, little ethanol): 77°–97° C.

During the continuous operation of the reflux distillation, the alcohol-containing and aroma-containing vapors are fractionated in the middle third of the fractionating column as follows:

The preliminary product and the alcohol fraction in the boiling region up to about 77° C., are removed through the head of the column, and the aromatic fractions in the boiling range from 77°–97° C., are removed laterally below the supply region of the column. The bubble content is kept at a constant level by continuous pump-removal of liquid.

The aromatic fractions obtained in the boiling range of 77°–97° C. contain both the aromatic substances typical of the species, as well as the larger part of the fermentation aromas. For the final mixture of the de-alcoholized wine-concentrate or fruit concentrate, for obtaining the final alcohol-free beverage, only the aromatic fractions contained in the boiling region from 77°–97° C. are utilized, in addition to the de-aromatized grape juice or fruit juice, and water free of any mineral substances. The initial product and the distillation remnants passed into the blower cannot be used for mixing of the alcohol-free beverage, as they contain, to a large degree, undesired components of smell and taste.

The complete mixture is subsequently prepared according to known technologic measures to result in an alcohol-free beverage ready for consumption, by impregnating the mixture with the required amount of carbon dioxide gas, by sterile filtration and/or pasteurization against any microbial spoilage, and by the addition of anti-oxidants, such as $SO_2$, or ascorbic acid, against any oxidation spoilage.

APPLICATION EXAMPLE 1

106.5 liters of a red wine of the type Pinot Noir (Blauburgunder) of the wine cellars of the Federal Research Institute Wäensil, having an alcohol content of 10.3% by volume, have been concentrated in a three-stage combined vapor distillation and aroma distillation pilot plant P103 of the type UNIPEKTIN. The pressure on the vapor side in the first, second and third evaporators was 1.8 bar, 1.35 bar, and 650 mbar, respectively, and in the filter III was 100 mbar. The product temperature in the three evaporating devices was 99°, 60° and 35° C., respectively. The throughput for 106.5 liters of red wine was a total of 46 minutes, corresponding to 139 l/h. The vapor condensate from the first and second evaporation stage was reunited and reached a total amount of 37.6 liters. The vapor condensate from the third evaporation stage was discarded, as it only contained traces of aromatic substances. There was obtained a total of 46.4 liters of de-alcoholized wine concentrate having a remaining alcohol content of 0.28 Vol.% (=2.2 g/l). The evaporation rate therefore amounted to 56.4%.

Two liters of the so-obtained vapor condensate having an alcohol content of 26.8 Vol.% were separated in a labor-rectification column having an inner diameter of 50 mm and a height of 1,600 mm by reflux distillation into three fractions at normal pressure. The column of the filling body were loaded with wire mesh rings having a passage of 3×3 mm, 2,500 meshes/cm$^2$ of the material number 4401, so that at least 60 theoretically separating stages may be obtained.

The distillation column has been first flooded with water at a total backflow. The vapor condensate previously warmed during passage thereto to 75° C., has been supplied at one-half height of the column at a dosage of 400 ml/h. In view of this supply procedure, a backflow of the aromatic substances in the distilling blower can be avoided, which leads to a lower heat stress of the aromatic substances. The removal of the various fractions is accomplished during a backflow ratio of 1:5 to 1:10. The distillation yield was about 30 ml/h. The following fractions were obtained:

Fraction 1: Preliminary product+ethanol<77° C., 130 ml distillate at 94.3% volume of alcohol;

Fraction 2: Ethanol<78° C., 0.412 ml distillate at 96.5% volume of alcohol;

Fraction 3: Aromatic substances>78°–79° C., 36 ml distillate at 22.5% volume of alcohol.

Gas-chromatographic investigations of the fraction obtained have shown that in addition to ethanol there is primarily contained methanol and ethyl acetate (preliminary product) in the fraction 1, namely, two components which can be dispensed with in any case for reasons of quality. The fraction 2 contains practically only ethanol.

The fraction 3 contains 80–85% of the aromatic substances present in the vapor condensate. The alcohol content of the fraction 3 is derived from azeotropic mixtures of aromatic substances with alcohol. In total the alcohol portion of the aromatic fraction 3 is about 1.5% of the original contents of the vapor condensate.

The aromatic substances obtained in fraction 3 were mixed with a de-alcoholized wine concentrate with de-aromatized grapefruit juice of the species Blauburgunder (Pinot noir), and with distilled water, to obtain alcohol-free wine ready for consumption, according to the following formula:

| | |
|---|---|
| De-alcoholized red wine concentrate (Blauburgunder) | 1,422 ml |
| Distilled water | 1,445 ml |
| De-aromatized grape juice (Blauburgunder) 16.6 Brix | 883 ml |
| Aromatic substances (fraction 3) | 36 ml |
| Alcohol-free red wine | 3,786 ml |

Then, following addition of 50 mg/l $SO_2$, this mixture was prefiltered through a K-10 filter layer, has been made bacteria-free through an EK filter, and has been filled in a sterile state into bottles. During tasting, this alcohol-free wine has produced a typical wine-type, and strong taste, reminiscent of the aroma of Blauburgunder.

The chemical analysis of this alcohol-free red wine has shown the following results:

| pH value | 3.60 |
| --- | --- |
| Titratable total acid | 5.0 g/l |
| Relative density 20/20 | 1.02316 |
| Sugar after inversion | 42 g/l |
| Ethyl alcohol | 2.4 g/l |
| | (= 2.34 g/kg) |

APPLICATION EXAMPLE 2

A hundred liters of apple wine with an alcohol content of 5.1% Vol. was concentrated in two steps in a one step stage UNIPEKTIN evaporator. In the first passage 15% of the apple wine was evaporated during normal pressure. There was a yield of 84.2 l apple wine concentrate with 6.4 g/l of alcohol and 15.7 l of aroma-containing vapor contents at 28.3% volume of alcohol. In the second passage there was evaporated an additional 20% of the 84.2 l amount of the apple wine concentrate at a pressure of 100 mbar. The total evaporation rate referred to the original apple wine, therefore amounted to 32%. The so obtained apple wine concentrate had a remaining alcohol content of 0.37% vol. (=2.9 g/l). The vapor concentrate obtained in the second evaporization step contained only a small amount of aromatic substances, with the exception of alcohol, the yield of which can be dispensed with.

Two liters of the vapor concentrate derived from the first passage and having an alcohol content of 28.3% Vol. were split in the labor rectification column, described for Application Example 1, at a normal pressure through distillation into three fractions. The aroma thus containing fraction 3 contained 46 ml of distillate at a volume of 27.8% of alcohol.

The mixture for an alcohol-free apple wine ready for consumption has been obtained according to the following formula:

| De-alcoholized apple wine concentrate | 3,840 ml |
| --- | --- |
| Distilled water | 1,760 ml |
| De-aromatized apple juice at 12.5° Brix | 2,800 ml |
| Aromatic substances (Fraction 3) | 46 ml |
| Alcohol-free apple juice | 8,446 ml |

This alcohol-free apple wine was filtered after an addition of 150 mg/l of ascorbic acid through a K-10 filter layer, was filled into bottles, closed with cork at the top and was pasteurized. During tasting this alcohol-free beverage had the typical smell and taste of a conventional apple wine.

The chemical analysis of the alcohol-free apple wine ready for consumption yielded the following results:

| pH value | 3.40 |
| --- | --- |
| Total amount of titrable acid | 5.3 g/l |
| Relative density 20/20 | 1.02175 |
| Sugar after inversion | 36 g/l |
| Ethyl alcohol | 2.6 g/l |
| | (= 2.54 g/kg) |

APPLICATION EXAMPLE 3

Ten liters of the evaporation process described according to Application Example 1 contained aroma-containing vapor condensate of Blauburgunder-red wine having an alcohol content of 26.8 Vol.% were fractionated in a continuing process by reflux distillation at normal pressure. The labor column described in Application Example 1 has been so modified, that 320 mm below the feed location of the column a lateral discharge region was installed.

The vapor concentrate, warmed during passage to 75° C. was supplied at one-half height of the column. The preliminary product and the alcohol fraction in the boiling region up to about 77° C. was removed through the column head. The aromatic fraction obtained in the lateral discharge region at the boiling region from 77°–97° C. yielded a total of 205 ml distillate with an alcohol content of 24.5% by vol. The fluid level in the distillation blower has been kept constant during continuous pumping thereof. For the mixture to an alcohol-free red wine the following parts were used:

| De-alcoholized red wine concentrate (Blauburgunder) | 7,110 ml |
| --- | --- |
| Mineral-free water | 7,225 ml |
| De-aromatized Blauburgunder grape juice, fruit juice 16.6° Brix | 4,415 ml |
| Aromatic substances, boiling ranging 77–97° C. | 205 ml |
| Alcohol-free red wine | 18,955 ml |

This mixture was impregnated with carbon-dioxide gas up to a $CO_2$ content of 0.8 g/l, was mixed with 50 mg/l $SO_2$, was prefiltered through K-10 filter layers, was made bacteria-free through an EK filter, and was filled in a sterile state into bottles. With the exception of a higher remaining alcohol content (total 2.9 g/l), the chemical analysis of this alcohol-free red wine was equal to that in the application example 1. As far as smell and taste is concerned, this alcohol-free beverage is strongly reminiscent of a conventional Blauburgunder wine.

We claim:

1. A method for the manufacture of alcohol-free wine product having a remaining alcohol content of less than 5 g/Kg using a concentrating plant and a separate counter-current distillation column having a head and at least forty theoretical plates including the steps of first evaporating between 30–60% of a completely fermented wine in said concentrating plant to produce a de-alcoholized wine concentrate and a vapor condensate containing alcohol and aromatic substances, then feeding said condensate to a supply location in the middle third of said column to separate said condensate into a fraction comprising alcohol and aromatic substances within the boiling range of 77° to 97° C.

withdrawing said fraction comprising alcohol from said column at a location above said supply location, withdrawing said aromatic substances at a location below said supply location, mixing together said aromatic substances, said dealcoholized wine or fruit juice concentrate, dearomatized grape juice or fruit juice and mineral-free or distilled water, impregnating the resultant mixture with carbon dioxide, stabilizing said alcohol-free wine product against microbiological spoilage and adding anti-oxidants so as to yield said alcohol-free wine product ready for consumption.

2. The method as claimed in claim 1, wherein the evaporating is performed in a multistage evaporator at a vacuum at temperatures of 15°–100° C.

3. The method as claimed in claim 1, further comprising the steps of initially evaporating 15–20% of the wine or fruit wine at normal pressure, and subsequently evaporating 15–25% thereof during a pressure below said normal pressure.

4. The method as claimed in claim 1, further comprising the step of separating the vapor condensate at normal pressure.

5. The method as claimed in claim 1, further comprising the step of separating the vapor condensate at a pressure below normal pressure.

6. The method as claimed in claim 1, wherein the total yield of the aromatic substances obtained from the vapor condensate is in excess of 80%.

7. The method as claimed in claim 1, wherein the evaporation level required for de-aromatizing of the grape juice or fruit juice is 15–30%.

* * * * *